US010136372B2

(12) United States Patent
Jung et al.

(10) Patent No.: US 10,136,372 B2
(45) Date of Patent: Nov. 20, 2018

(54) RELAY UE SELECTING METHOD PERFORMED BY UE IN WIRELESS COMMUNICATION SYSTEM AND UE USING THE SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/272,256

(22) Filed: Sep. 21, 2016

(65) Prior Publication Data

US 2017/0086114 A1 Mar. 23, 2017

Related U.S. Application Data

(60) Provisional application No. 62/222,166, filed on Sep. 22, 2015.

(30) Foreign Application Priority Data

Sep. 20, 2016 (KR) .................. 10-2016-0119872

(51) Int. Cl.
| *H04L 1/00* | (2006.01) |
| *H04W 36/08* | (2009.01) |
| *H04W 52/38* | (2009.01) |
| *H04W 52/46* | (2009.01) |
| *H04B 17/327* | (2015.01) |
| *H04W 88/04* | (2009.01) |
| *H04B 17/318* | (2015.01) |

(52) U.S. Cl.
CPC .......... *H04W 36/08* (2013.01); *H04B 17/327* (2015.01); *H04W 52/383* (2013.01); *H04W 52/46* (2013.01); *H04B 17/318* (2015.01); *H04W 88/04* (2013.01); *Y02D 70/124* (2018.01); *Y02D 70/126* (2018.01)

(58) Field of Classification Search
CPC .... H04W 36/08; H04W 88/04; H04B 17/327; H04B 17/318
USPC ........................................................ 370/252
See application file for complete search history.

(56) References Cited

U.S. PATENT DOCUMENTS

| 2014/0220902 | A1* | 8/2014 | Clevorn | H04B 7/0814 |
| | | | | 455/63.4 |
| 2016/0286374 | A1* | 9/2016 | Baghel | H04B 17/318 |
| 2016/0295494 | A1* | 10/2016 | Gulati | H04W 40/22 |
| 2016/0337954 | A1* | 11/2016 | Gulati | H04B 7/155 |

* cited by examiner

*Primary Examiner* — Faisal Choudhury
(74) *Attorney, Agent, or Firm* — Lee Hong Degerman Kang Waimey

(57) ABSTRACT

A method of selecting a relay user equipment (UE) performed by a remote UE in wireless communication system, and a UE using the method are provided. The method includes determining whether a measurement of a current relay UE is smaller than a threshold and selecting a candidate relay UE satisfying a specific condition as a relay UE when the measurement of the current relay UE is smaller than the threshold. Here, the candidate relay UE is selected as a relay UE only when a measurement of the candidate relay UE is greater than a minimum hysteresis value (min-Hyst) based on the threshold.

10 Claims, 19 Drawing Sheets

RELAY UE SELECTING METHOD PERFORMED BY UE IN WIRELESS COMMUNICATION SYSTEM AND UE USING THE SAME

CROSS-REFERENCE TO RELATED APPLICATIONS

Pursuant to 35 U.S.C. § 119, this application claims the benefit of earlier filing date and right of priority to Korean Patent Application No. 10-2016-0119872, filed on Sep. 20, 2016, and also claims the benefit of U.S. Provisional Application No. 62/222,166, filed on Sep. 22, 2015, the contents of which are all hereby incorporated by reference herein in their entirety.

BACKGROUND OF THE INVENTION

Field of the Invention

The present invention relates to wireless communications, and more particularly, to a relay UE selecting method performed by a UE in a wireless communication system, and a UE using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

A D2D operation is also referred to as a proximity service (ProSe) operation in view of signal transmission and reception between neighboring devices and has various advantages. For example, a D2D user equipment (UE) may perform data communication with a high transmission rate and low delay. Further, the D2D operation may distribute traffic concentrated on a base station, and may also function to extend the coverage of the base station if the D2D UE serves as a relay.

The D2D UE may also operate as a UE serving as a relay to connect a sidelink and a cellular link. That is, the D2D UE may operate as a relay UE.

A relay UE may serve as a relay between a specific UE and a network, in which the specific UE may be referred to as a remote UE. A remote UE may select a relay UE, in which it is necessary to specify a method for selecting a relay UE.

Particularly, if a remote UE uses only a process of comparing a measurement of a link between the remote UE and a candidate relay UE with a determined threshold to select a relay UE, a network hardly intervenes in the relay UE selecting process. That is, it is difficult for the network to control the process for the remote UE to select the relay UE.

SUMMARY OF THE INVENTION

An aspect of the present invention is to provide a relay UE selecting method performed by a UE in a wireless communication system, and a UE using the same.

In one aspect, provided is a method of selecting a relay user equipment (UE) performed by a remote UE in wireless communication system. The method includes determining whether a measurement of a current relay UE is smaller than a threshold and selecting a candidate relay UE satisfying a specific condition as a relay UE when the measurement of the current relay UE is smaller than the threshold. The candidate relay UE is selected as a relay UE only when a measurement of the candidate relay UE is greater than a minimum hysteresis value (minHyst) based on the threshold.

When an upper layer of the remote UE instructs the remote UE to reselect a relay UE, the candidate relay UE may be selected as a relay UE only when the measurement of the candidate relay UE is greater than the minimum hysteresis value (minHyst) based on the threshold.

The measurement of the current relay UE may be a reference signal received power (RSRP) of a reference signal received from the current relay UE.

The candidate relay UE may be not selected as a relay UE only when the measurement of the candidate relay UE is greater than the threshold and is equal to or smaller than a sum of the threshold and the minimum hysteresis value (minHyst).

The threshold may be provided from a network.

The relay UE may be a device providing a relay service between the remote UE and a network.

In another aspect, provided is a user equipment (UE). The UE includes a radio frequency (RF) unit to transmit and receive a radio signal and a processor operatively connected to the RF unit. The processor determines whether a measurement of a current relay UE is smaller than a threshold, and to select a candidate relay UE satisfying a specific condition as a relay UE when the measurement of the current relay UE is smaller than the threshold, in which the candidate relay UE is selected as a relay UE only when a measurement of the candidate relay UE is greater than a minimum hysteresis value (minHyst) based on the threshold.

According to the present invention, it may be prevented to unnecessarily change/reselect a relay UE despite no significant difference in channel quality. Further, the necessity to reselect a relay UE may change by each remote UE, which may be considered to control a relay UE reselecting process.

DESCRIPTION OF EXEMPLARY EMBODIMENTS

Figure 1:
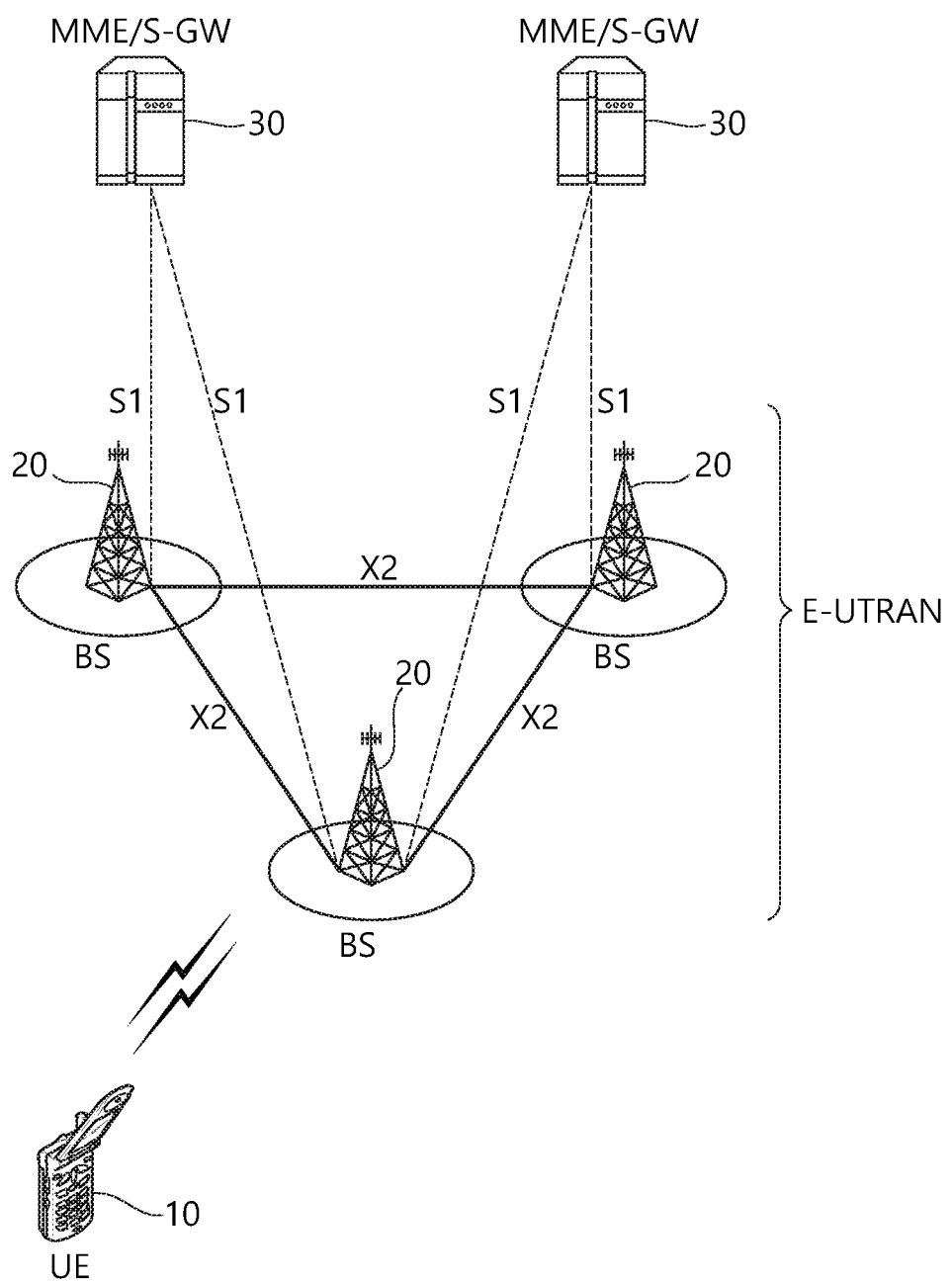
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
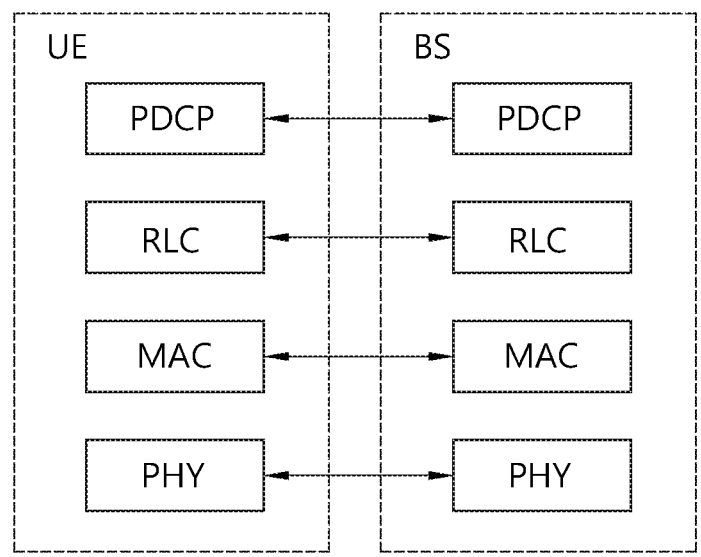
FIG. 2 is a diagram showing a wireless protocol architecture for a user plane.
Figure 3:
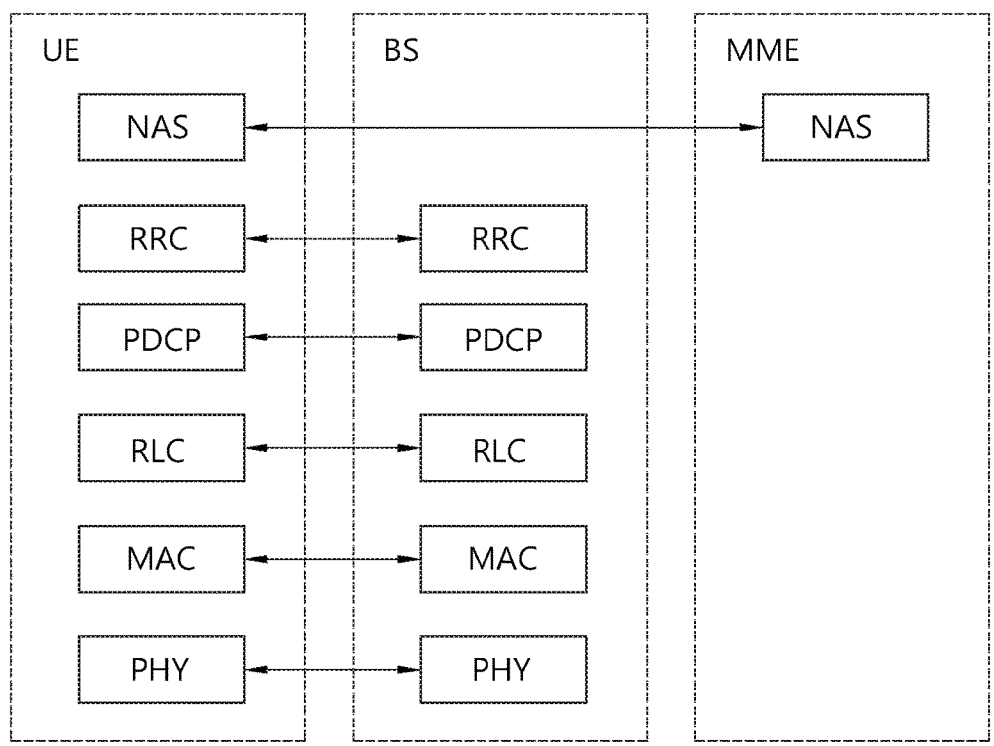
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
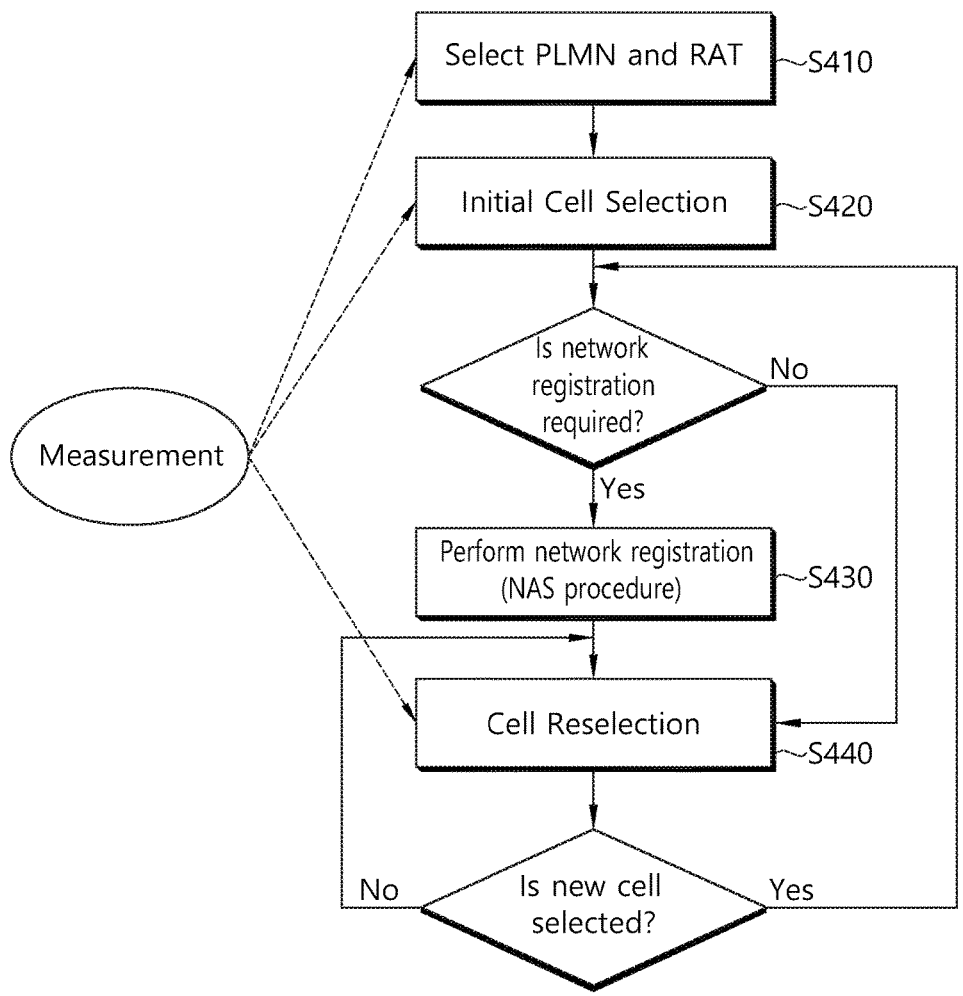
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
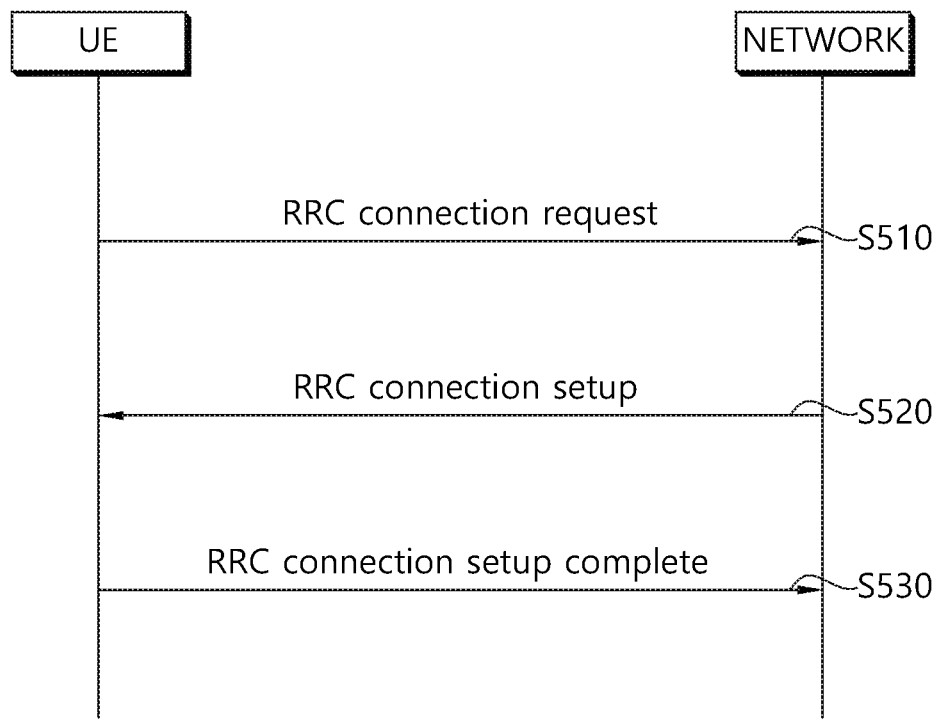
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
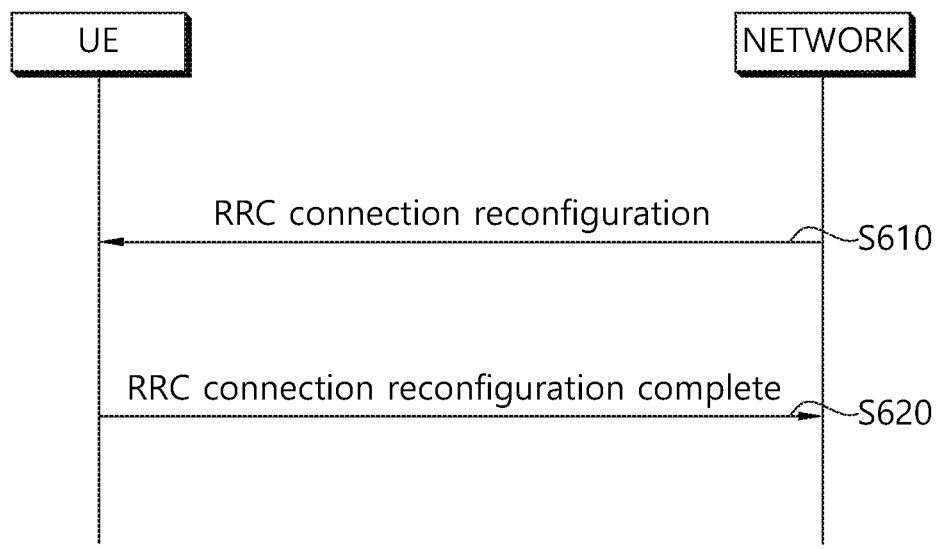
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0 \qquad \text{[Equation 1]}$$

where:

$$Srxlev = Q_{rxlevmeas} - (Q_{xlevmin} + Q_{rxlevminoffset}) - P\text{compensation}$$

$$Squal = Q_{qualmeas} - (Q_{qualmin} + Q_{qualminoffset})$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Qmeas,s + Qhyst, \quad Rn = Qmeas,s - Qoffset \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
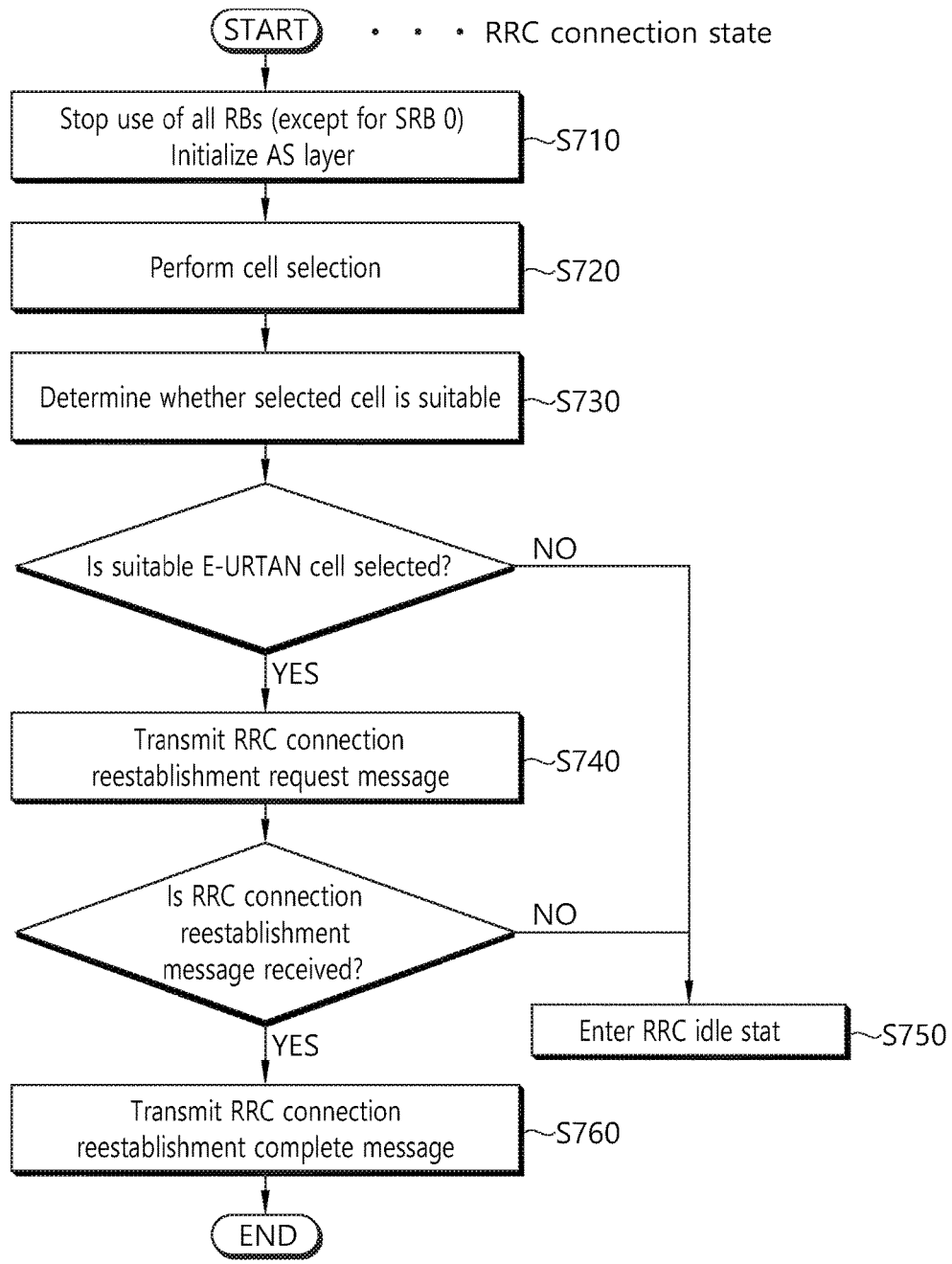
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
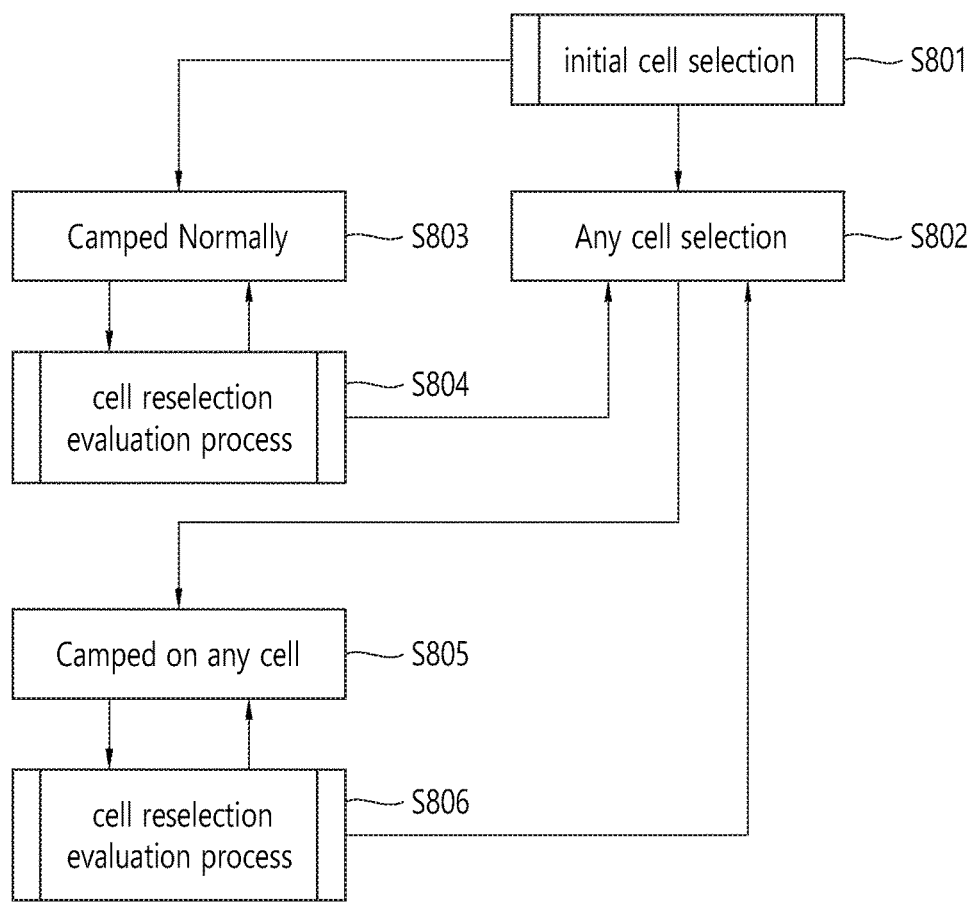
FIG. 8 illustrates substrates which may be owned by UE in the RRC_IDLE state and a substate transition process.

FIG. 8 illustrates substrates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Hereinafter, a D2D operation will be described. In 3GPP LTE-A, a service associated with the D2D operation is referred to as proximity based services (ProSe). Hereinafter, the ProSe is an equivalent concept to the D2D operation and the ProSe may be mixedly used with the D2D operation. Hereinafter, the ProSe will be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
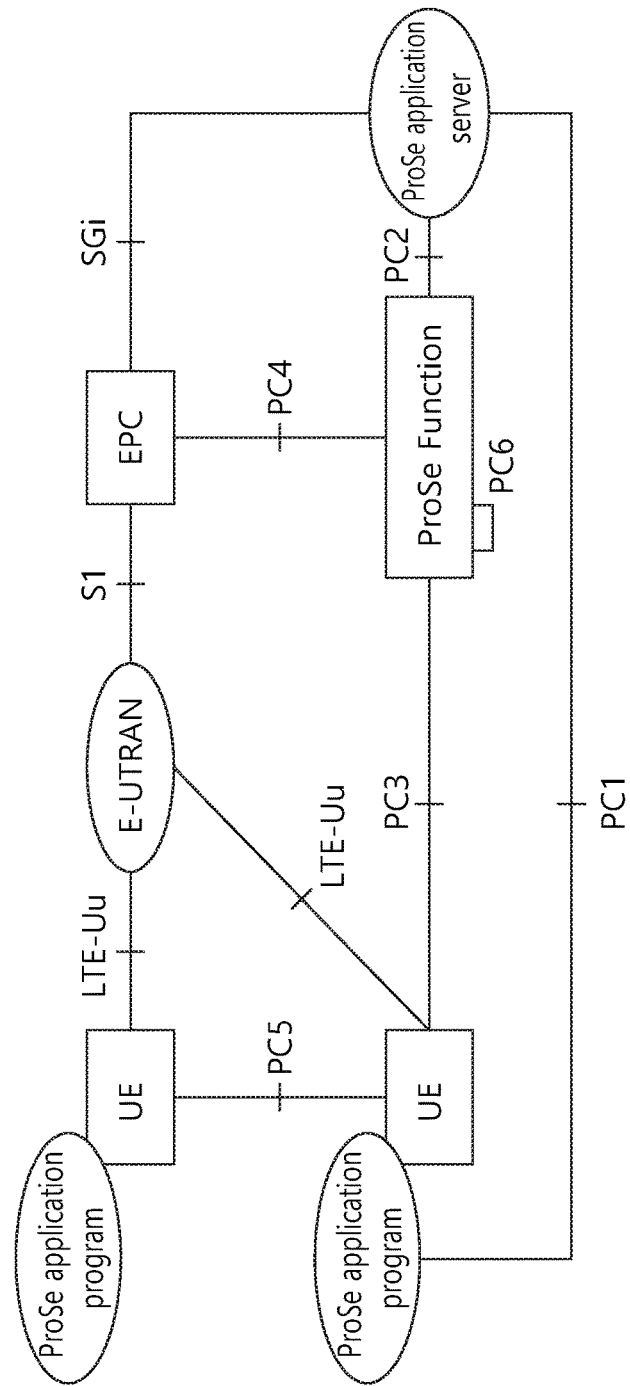
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
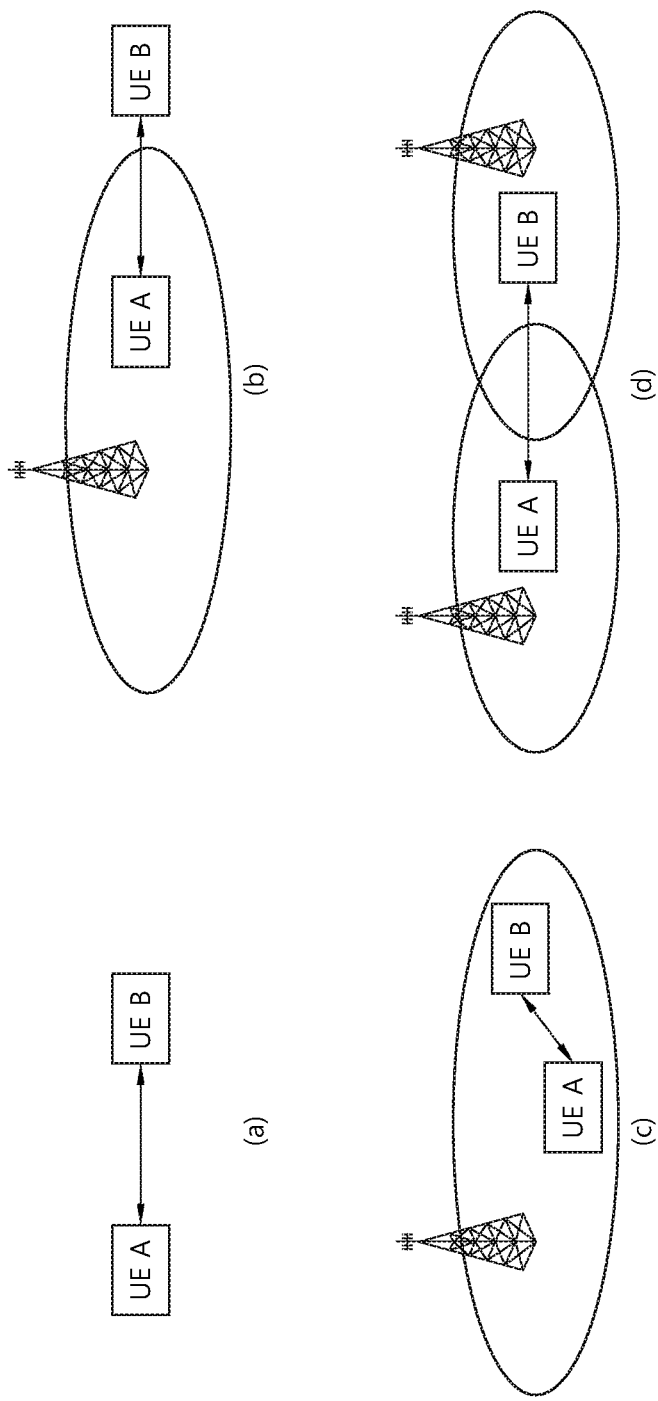
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
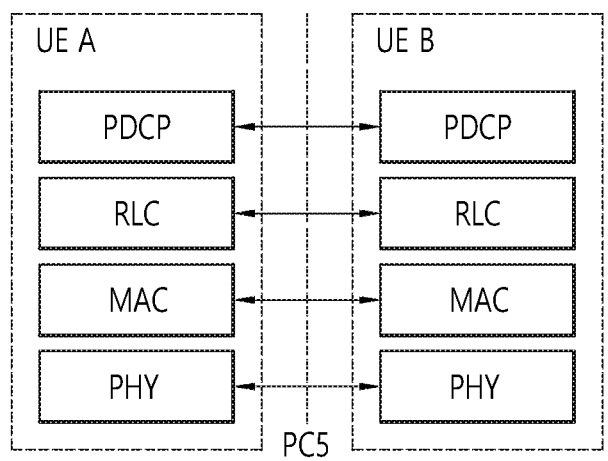
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
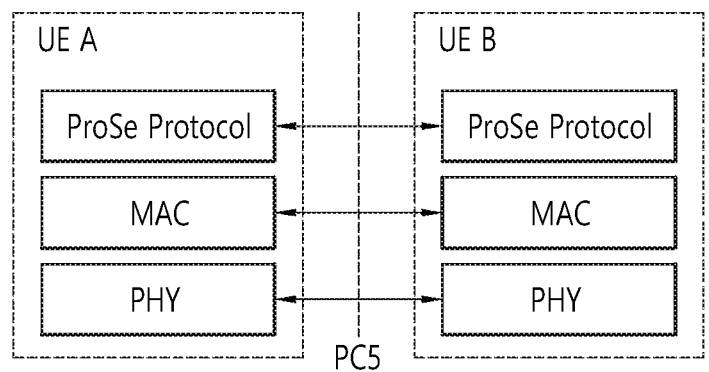
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC CONNECTED state for discovery information announcement.

An eNB may configure that UE has to use a type 1 resource pool for discovery information announcement or has to use a type 2 resource through an RRC signal in relation to UE in the RRC_CONNECTED state.

Hereinafter, a sidelink may refer to a UE-to-UE interface for D2D communication and D2D discovery. The sidelink corresponds to the foregoing PC5 interface. Channels defined/used in a sidelink include a physical sidelink control channel (PSCCH) and a physical sidelink broadcast channel (PSBCH) as a control channel for broadcasting basic system information for D2D communication. Further, a channel for transmitting a D2D discovery signal may be defined as a physical sidelink discovery channel (PSDCH). A D2D synchronization signal may be referred to as a sidelink synchronization signal (SLSS) or D2D synchronization signal (D2DSS).

In an LTE-A system (Rel-12, 13 or above), a D2D communication UE is configured to transmit a PSBCH and an SLSS together or to transmit an SLSS. Further, the LTE-A system defines new sidelink reference signal received power (S-RSRP) for synchronizing with another UE in D2D communication. That is, for D2D communication, UEs may measure S-RSRPs and only UEs having S-RSRPs of a specific value or higher may synchronize with each other to perform D2D communication. Here, S-RSRP may be measured from a demodulation reference signal (DM-RS) on a PSBCH. Here, S-RSRP may be measured from a DM-RS on a PSDCH for a D2D relay operation. Meanwhile, sidelink discovery reference signal received power (SD-RSRP) may be used for a D2D relay operation. SD-RSRP may be defined as a linear average of power contributions of resource elements carrying a DM-RS associated with a PSDCH authenticated with a cyclic redundancy check (CRC). A reference point of SD-RSRP may be an antenna connector of a UE. When receive diversity is used by a UE, a value lower than SD-RARP by an individual diversity branch may not be reported.

Further, an out-coverage UE may measure S-RSRP/SD-RSRP based on an SLSS and/or a DM-RS of a PSBCH/PSCCH/PSSCH, thereby determining whether the out-coverage UE becomes a synchronization source to perform a D2D relay operation.

Hereinafter, a D2D relay operation is referred to simply as a relay operation, and a UE performing a D2D relay operation is referred to as a relay UE. A relay UE may be located between a first UE and a second UE to relay a signal between the first and second UEs. In addition, a relay UE may be located between another UE and a network (cell/base station) to relay a signal between the other UE and the network. Hereinafter, a relay UE defines as a UE that relays a signal between another UE and a network.

Figure 13:
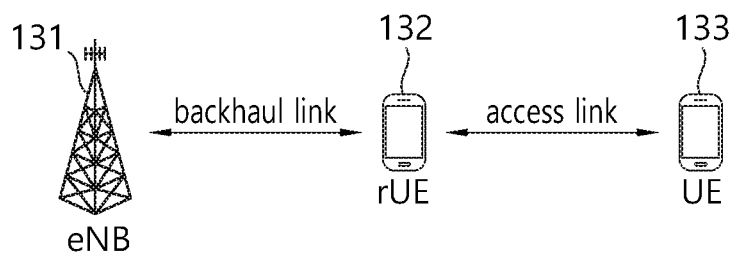
FIG. 13 illustrates a relay UE.

FIG. 13 illustrates a relay UE.

A relay UE 132 is a UE that provides network connectivity for a remote UE 133. The relay UE 132 serves to relay a signal between the remote UE 133 and a network 131. The remote UE 133 may be a UE that is located out of the coverage of a base station (BS), or is located in the coverage but has difficulty in direct communication with the BS.

The relay UE may transmit information received from the BS to a normal UE or may transmit information received from the normal UE to the BS, while maintaining both a link with the BS and a link with the normal UE (for example, a remote UE). Here, the link between the BS and the relay UE is referred to as a backhaul link, and the link between the relay UE and the remote UE is referred to as an access link. Further, a link for direct communication between UEs without involvement of the BS may be defined as a D2D link or sidelink.

Figure 14:
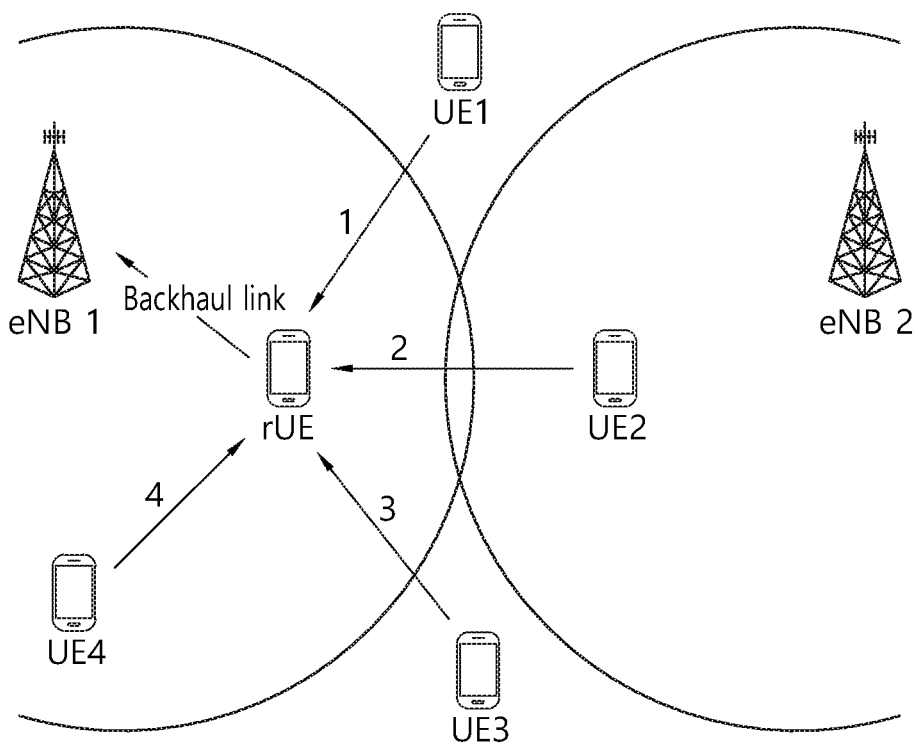
FIG. 14 illustrates a relationship between a relay UE and a remote UE.

FIG. 14 illustrates a relationship between a relay UE and a remote UE.

In FIG. 14, UE1 and UE3 are out-coverage UEs, UE2 and UE4 are in-coverage UEs, and rUE denotes a relay UE configured to perform a relay operation. Here, UE2 is an in-coverage UE for a second BS (eNB2) but is an out-coverage UE for a first BS. The first BS (eNB1) may be a serving cell of rUE.

rUE is a UE set as rUE via an instruction from the first BS (eNB1) or coordination between rUEs, and rUE may broadcast a discovery signal so that neighboring UEs may recognize the presence of rUE. For uplink transmission, rUE may receive a D2D signal from a UE (that is, UE4) in a network of the serving cell, a UE (that is, UE2) in a network of a neighboring cell, and out-coverage UEs (that is, UE1 and UE3).

Hereinafter, a process in which a remote UE selects a relay UE is described in detail. Further, described is an operation/process performed in protocol layers of the remote UE when the remote UE selects the relay UE.

The process in which the remote UE selects the relay UE may largely include three operations, in which different levels of RAN auxiliary information and control information may be provided respectively. The remote UE may be located in the coverage of a BS or out of the coverage of the BS, and the level of control by the BS may depend on the location of the remote UE.

Each of the operations for selecting a relay UE among candidate relay UEs is described.

Setting up a relay UE is achieved between candidate relay UEs and a network, which may be referred to as operation 1: setup of relay UE.

In order to participate in a discovery operation and to perform a relay operation between the remote UE and the network, a candidate relay UE may need to be authenticated as a UE serving as a relay from the remote UE to the network. Thus, the candidate relay UE may need to enter an RRC connected state and to be permitted by the network (BS) to operate as a relay UE.

Further, there are two applicable modes of a discovery transmitted by a relay UE (which is referred to as a relay discovery), which are relay discovery transmission initiated from the relay UE and relay discovery transmission initiated from the remote UE. The BS may configure/control which to use among the two modes.

That is, in order to participate in a relay discovery and serves as a relay between the remote UE and the network, the relay UE may need to enter the RRC connected state and to receive permission from the BS.

Next, the candidate relay UE transmits a relay discovery signal to the remote UE, which may be referred to operation 2: relay discovery assisted by the network.

In operation 2, if the remote UE is located out of cell coverage, the remote UE evaluate candidate relay UEs. If the remote UE is located in the cell coverage, a serving cell of the remote UE may select a relay UE among candidate relay UEs based on a measurement report received from the remote UE or the candidate relay UEs. Here, it is assumed that the remote UE is located out of the cell coverage and the remote UE selects a relay UE.

As a relay UE selection criterion, parameters about connectivity (for example, APN information) of a candidate relay UE and a measurement result (for example, RSRP/RSRQ of a sidelink) may be used. Criteria for the remote UE to select a relay UE include an upper-layer criterion and a lower-layer criterion. For an in-coverage remote UE, the BS may configure relay discovery to be initiated by the remote UE.

When the remote UE selects a specific candidate relay UE as a relay UE, a sidelink is established between the specific candidate relay UE and the remote UE, which may be referred to as operation 3: establishment of secure layer-2 link over interface PC5.

In operation 3, unicast connection is established between the remote UE and the relay UE through interface PC5. This process may include authentication and security setting. The security part of this process may be processed by SA3.

In terms of RAN, there may be four cases with respect to mobility of the remote UE.

Case 1: When an in-coverage remote UE establishes connection with a relay UE.

Intra-E-UTRAN-Access Mobility Support in an ECM connected state for UEs may include a handover process and a dual connectivity-related process. In the handover process, a source BS (source eNB) issues a decision/instruction to allow a UE to use a radio resource provided by a target BS. Similarly, in the dual connectivity-related process, a master eNB (MeNB) issues a decision/instruction to allow a UE to use a radio resource provided by a secondary eNB (SeNB).

Mobility between RATs is controlled by the network, and this control is performed by the source BS. That is, the source BS issues a decision/instruction to allow a UE to use a radio resource of a target RAT.

Thus, mobility of a UE in the RRC connected state is based on a handover by the control of the network with the aid of the UE. The BS may control the mobility using a combination of system information and a dedicated message (RRC connection reconfiguration).

A relay UE that relays transmission from the remote UE to the network may be considered as a different target for the remote UE. The source BS may determine to allow the remote UE in the RRC connected state to use a relay UE that performs a handover between RATs or a relay from the remote UE to the network, and may need a measurement result for this determination.

An in-cell coverage UE may be in an RRC idle state or RRC connected state according to an activation level of the UE. When the UE is in the RRC connected state, the UE can transmit and receive data, with service continuity maintained and without data loss, through a handover under the control of the network. Accordingly, the remote UE in the RRC connected state may be connected with the relay UE under the control of the network. A UE in the RRC idle state does not perform data transmission and reception and thus does not need to establish connection with the relay UE. Thus, the UE in the RRC idle state first needs to enter the RRC connected state.

The degree to which the BS is involved in control in selecting an in-coverage relay UE may vary. The degree to which the BS is involved in control may be divided into levels 0, 1, 2, and 3.

Level 0: The remote UE may select a relay UE according to implementation thereof. When no more data is transmitted in interface Uu between the BS and the UE, a deactivation timer releases the remote UE.

Level 1: The remote UE may select a relay UE based on parameters included in system information provided from the BS. When no more data is transmitted in interface Uu between the BS and the UE, the deactivation timer releases the remote UE.

Level 2: The remote UE may select a relay UE based on parameters included in a dedicated signal provided from the BS. When no more data is transmitted in interface Uu between the BS and the UE, the deactivation timer releases the remote UE.

Level 3: The remote UE reports, to the BS, a measurement result regarding a candidate relay UE satisfying the minimum condition. The BS selects a relay UE among candidate relay UEs and hands over the remote UE to the selected relay UE. The handover may be instructed using an RRC connection reconfiguration message or RRC release message.

According to level 3, since the relay UE is selected by the BS, flexibility and consistency with a conventional operation may be maximally maintained.

The minimum condition may includes: 1. connectivity provided by a relay UE that satisfies a requirement provided by an upper layer; and 2. sidlink measurement quality (for example, sidelink RSRQ), obtained by the remote UE measuring a discovery signal received from the relay UE, which is a set threshold or higher.

Case 2: When a remote UE connected to a relay UE selects and connects to another relay UE.

In this case, the remote UE may be an out-coverage UE. The remote UE may perform a relay UE reselection process. The relay UE reselection process may be divided into three processes as follows.

1. The remote UE maintains a set of relay UEs satisfying the minimum condition, for example, UEs having connectivity and a sidelink measurement that exceed certain thresholds, (defined as a candidate set). To this end, the remote UE may use a discovery operation.

2. When the relay UE currently connected does not satisfy the minimum condition, the remote UE triggers a reselection process of selecting another relay UE from the candidate set, excluding the currently connected relay UE. Before excluding the currently connected relay UE from the candidate set, the remote UE may use a timer and/or hysteresis.

3. A relay UE may be reselected by one of the following methods.

a. The remote UE may rank the candidate relay UEs included in the candidate set and may select a candidate relay UE having the highest ranking as a relay UE. Rankings may be determines based on an RSRP measurement of a sidelink between each candidate relay UE and the remote UE.

b. The remote UE may determine, as a relay UE, a randomly selected candidate relay UE among the candidate relay UEs included in the candidate set.

c. The remote UE selects a relay UE among the candidate relay UEs included in the candidate set based on implementation of the UE. That is, the remote UE selects a relay UE according to an implementation method thereof.

Parameters used for a minimum condition for determining the candidate relay UEs included in the candidate set may be preconfigured or be configured by the network. Among methods a, b, and c described above, method a of ranking the candidate relay UEs is advantageous in that a parameter used for ranking may be preconfigured or be controlled by the network. The network may configure or predetermine which to use among methods a, b, and c.

Case 3: When a remote UE connected to a relay UE enters cell coverage.

In this case, the remote UE performs cell selection of selecting an E-UTRAN cell. The UE may trigger an RRC connection establishment procedure according to an EMM state. For example, the UE may trigger the RRC connection establishment procedure to update a tracking area (TA).

When the remote UE connected to the relay UE, which is located out of cell coverage, enters the cell coverage of a specific BS and this entrance is detected, the remote changes a state of being served by the relay UE to a state of being served by the specific BS.

Case 4: When an out-coverage remote UE is connected to a relay UE.

In this case, the remote UE may perform an initial relay UE selecting process including the following two operations.

1. The remote UE generates a set of relay UEs satisfying the minimum condition, for example, UEs having connectivity and a sidelink measurement that exceed certain thresholds, (defined as a candidate set). To this end, the remote UE may use a sidelink discovery operation, that is, a procedure for attempting to receive a sidelink discovery signal transmitted from a relay UE.

2. The remote UE selects a relay UE. A relay UE may be selected by one of the following methods.

a. The remote UE may rank the candidate relay UEs included in the candidate set and may select a candidate relay UE having the highest ranking as a relay UE. Rankings may be determines based on an RSRP measurement of a sidelink (for example, SD-RSRP) between each candidate relay UE and the remote UE.

b. The remote UE may determine, as a relay UE, a randomly selected candidate relay UE among the candidate relay UEs included in the candidate set.

c. The remote UE selects a relay UE among the candidate relay UEs included in the candidate set based on implementation of the UE. That is, the remote UE selects a relay UE according to an implementation method thereof.

Parameters used for a minimum condition for determining the candidate relay UEs included in the candidate set may be preconfigured or be configured by the network. Among methods a, b, and c described above, method a of ranking the candidate relay UEs is advantageous in that a parameter used for ranking may be preconfigured or be controlled by the network. The network may configure or predetermine which to use among methods a, b, and c.

Hereinafter, the present invention is described.

If a remote UE uses only PC5 measurement, that is, a process of comparing a measurement of a link between the remote UE and a candidate relay UE with a determined threshold, to select a relay UE, a network hardly intervenes in the relay UE selecting process. That is, it is difficult for the network to control the process for the remote UE to select the relay UE.

The network may apply a specific bias value, offset value, or hysteresis value to the relay UE selecting process of the remote UE according to knowledge or preference thereof in order to control the relay UE selecting process.

Figure 15:
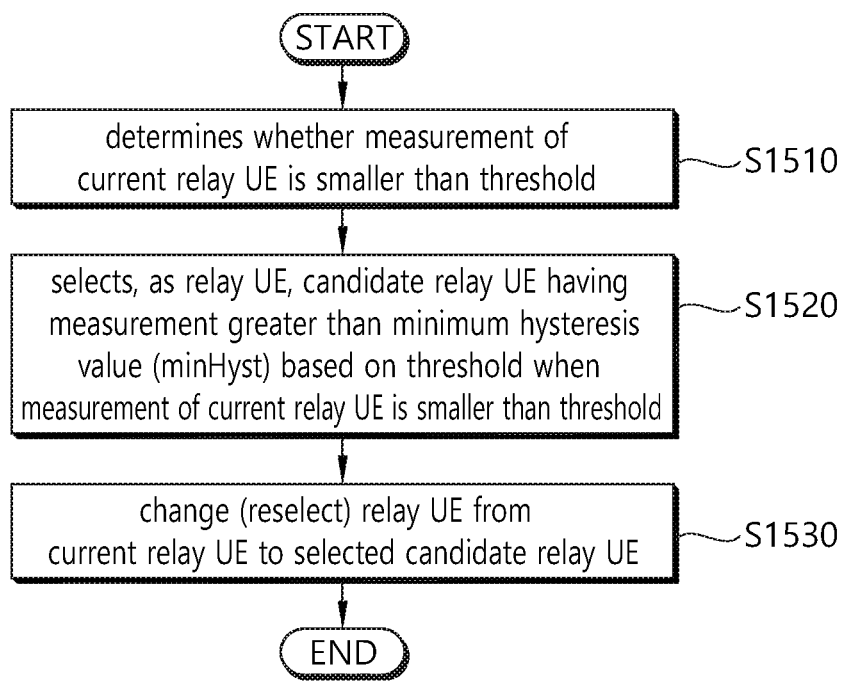
FIG. 15 illustrates a method for a remote UE to select a relay UE.

FIG. 15 illustrates a method for a remote UE to select a relay UE.

Referring to FIG. 15, a remote UE determines whether a measurement of a current relay UE is smaller than a threshold (S1510). The measurement may be the measured receive power value of a reference signal (RSRP) received from the current relay UE.

When the measurement of the current relay UE is smaller than the threshold, the remote UE selects, as a relay UE, a candidate relay UE having a measurement greater than the minimum hysteresis value (minHyst) based on the threshold (S1520).

That is, the remote UE selects, as a relay UE, not a candidate relay UE just having a measurement (for example, sidelink RSRP) greater than the threshold but a candidate relay UE having a measurement greater than the minimum hysteresis value based on the threshold among candidate relay UEs. The remote UE does not select, as a relay UE, a candidate relay UE having a measurement that is greater than the threshold but is the sum of the threshold and the minimum hysteresis value (minHyst) or smaller.

According to this method, it may be prevented to unnecessarily change/reselect a relay UE despite no significant difference in channel quality. Further, the necessity to reselect a relay UE may change by each remote UE, which may be considered to control a relay UE reselecting process. For example, a first remote UE may currently intend to reselect a relay UE in order to transmit and receive a signal for public safety or an emergency, and a second remote UE may intend to reselect a relay UE to just transmit and receive user data. If it is important for the first remote UE to reselect a reliable relay UE despite frequent changes in a relay UE and frequent changes in a relay UE are not preferable for the second remote UE, the minimum hysteresis value for the first remote UE may be set relatively low and the minimum hysteresis value for the second remote UE may be set relatively high.

The remote UE changes (reselects) a relay UE from the current relay UE to the selected candidate relay UE (S1530).

Figure 16:
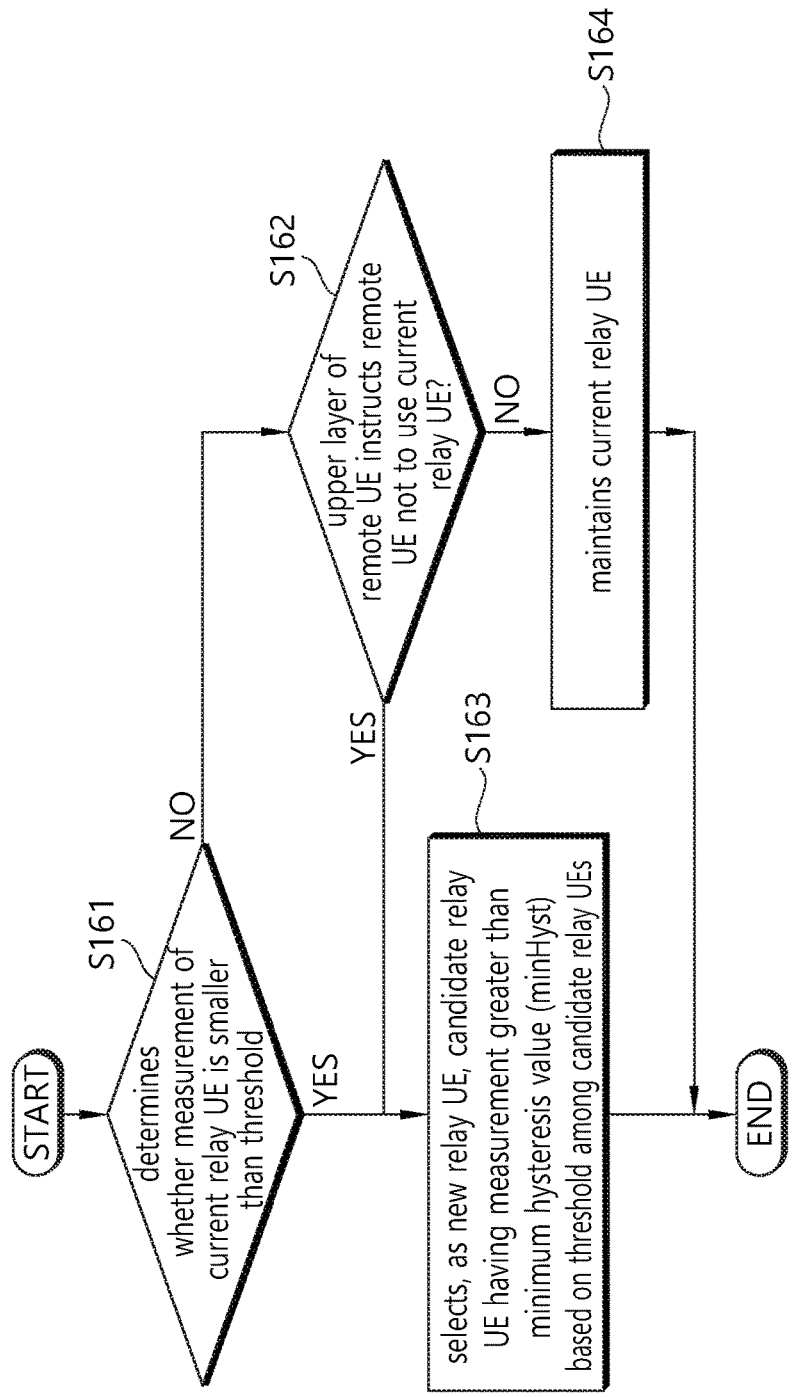
FIG. 16 is a specific example of applying the method of FIG. 15.

FIG. 16 is a specific example of applying the method of FIG. 15.

Referring to FIG. 16, a remote UE determines whether a measurement of a current relay UE is smaller than a threshold (S161). The measurement may be the RSRP of the current relay UE.

When the measurement of the current relay UE is smaller than the threshold, the remote UE selects, as a new relay UE, a candidate relay UE having a measurement greater than the minimum hysteresis value (minHyst) based on the threshold among candidate relay UEs (S163).

When the measurement of the current relay UE is equal to or greater than the threshold, the remote UE determines whether an upper layer thereof instructs the remote UE not to use the current relay UE (S162).

When the upper layer of the remote UE instructs the remote UE not to use the current relay UE, the remote UE selects, as a new relay UE, a candidate relay UE having a measurement greater than the minimum hysteresis value (minHyst) based on the threshold among candidate relay UEs (S163). That is, although the measurement of the current relay UE is greater than the threshold, there is a need to change a relay UE for different reasons, in which case the upper layer of the remote UE may instruct the remote UE to change a relay UE and accordingly the remote UE may select a new relay UE.

When the upper layer of the remote UE does not instruct the remote UE not to use the current relay UE, the remote UE maintains the current relay UE (S164).

Meanwhile, two hysteresis values may be adopted for the relay UE selecting process. A first hysteresis value (referred to as MinHyst) may be a hysteresis value applied for a suitability condition, and a second hysteresis value (DiffHyst) may be a hysteresis value applied for reselection triggering.

When a PC5 measurement (RSRP) of the currently used relay UE (current relay UE) is smaller than a suitability threshold, the remote UE may consider the current relay UE to be unsuitable as a relay UE.

When a candidate relay UE has a PC5 measurement that is greater by the first hysteresis value (MinHyst) than the threshold and is greater by the second hysteresis value (DiffHyst) than the PC5 measurement of the current relay UE, the remote UE may select the candidate relay UE as a new relay UE.

When evaluating a PC5 measurement of one or more detected relay UEs, layer-3 filtering may be applied using a preset field coefficient before using a PC5 measurement result.

Figure 17:
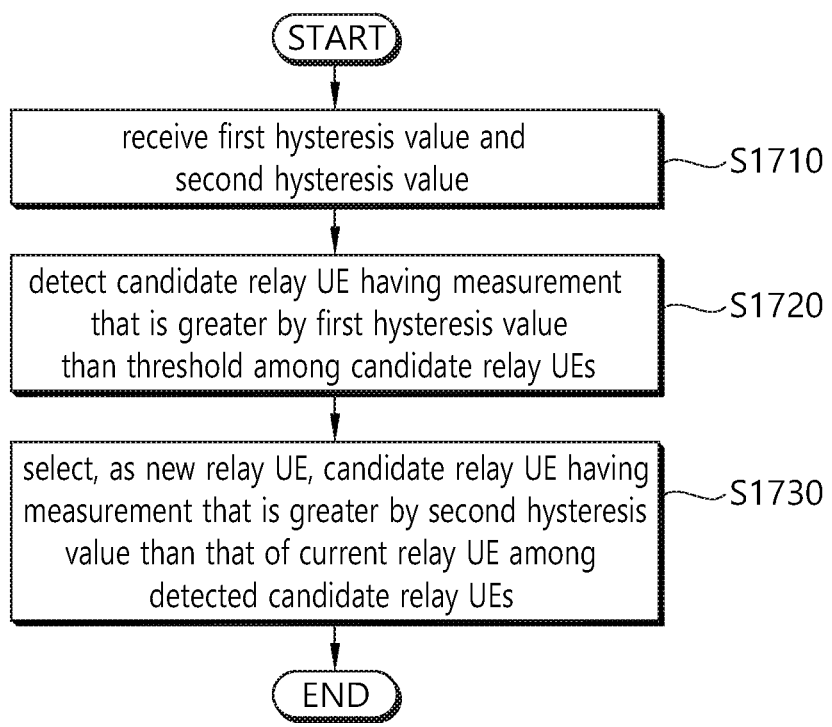
FIG. 17 illustrates a method for a remote UE to select a relay UE using two hysteresis values.

FIG. 17 illustrates a method for a remote UE to select a relay UE using two hysteresis values.

Referring to FIG. 17, a remote UE receives a first hysteresis value and a second hysteresis value (S1710).

The remote UE detects a candidate relay UE having a measurement that is greater than the sum of a threshold and the first hysteresis value among candidate relay UEs (S1720). That is, defining a measurement of a candidate relay UE as M, the threshold as T, and the first hysteresis value as H, a candidate relay UE having M>T+H is detected.

The remote UE selects, as a new relay UE, a candidate relay UE having a measurement that is greater by the second hysteresis value than that of a current relay UE among the detected candidate relay UEs (S1730).

Alternatively, when the remote UE has no current relay UE or considers a current relay UE to be unsuitable, the remote UE may detect a PC5 measurement of a candidate relay UE that is greater by the first hysteresis value than the threshold and may consider a relay offset to select a UE having the highest PC5 measurement result. The relay offset may be an offset specified by candidate relay UE or an offset specified for a relay group including a plurality of candidate relay UEs.

When there are one or more suitable candidate relay UEs, the remote UE may be forced to select a candidate relay UE in the highest rank, that is, a candidate relay UE having the highest PC5 measurement result.

Alternatively, when there are one or more suitable candidate relay UEs, the remote UE may be allowed to select a random candidate relay UE among candidate relay UEs satisfying a suitability condition, considering that a candidate relay UE having a higher PC5 measurement result does not guaranteed higher quality in a combined link, that is, a PC5 link (a link between the remote UE and the candidate relay UE) combined with a link between a network and the candidate relay UE. When this method is employed, it may be necessary to adopt a mechanism for preventing the remote UE from too frequently reselecting a relay UE. For example, once the remote UE selects a relay UE (that is, when the remote UE establishes an L2 link with the relay UE for 1:1 sidelink communication), the remote UE may select a different candidate relay UE when at least one of the following reselection conditions is satisfied.

1) When an upper layer of the remote UE triggers reselection of a relay UE.
2) When the upper layer of the remote UE provides a list of candidate relay UEs.
3) When a PC5 measurement result of a serving relay UE does not exceed a threshold.
4) When a PC5 measurement result of a different candidate relay UE exceeds the threshold by a determined hysteresis value
5) When a PC5 measurement result of a serving relay UE exceeds the threshold and time for which the remote UE is connected to the serving relay UE after selecting the serving relay UE is longer than a threshold.

<Relay UE Selection Offset Applied to Relay UE>

A network may set a bias for a candidate relay UE. For example, the network may want a remote UE to select candidate relay UEs having a higher Uu quality (quality of a link between the network and a candidate relay UE). Further, the network may want the remote UE not to select candidate relay UEs having a higher traffic load. In addition, the network may want the remote UE to select candidate relay UEs located in the same cell as the remote UE.

In this case, the network adopts a UE-specific offset parameter to allow a candidate relay UE to have a bias. Since a relay UE may be distinguished by an identifier (ID) of the relay UE, the offset may be associated with a UE identifier. For a case where the remote UE is located in network coverage, the network may transmit the offset parameter. For example, the network may transmit the offset parameter to the remote UE through a broadcast channel or a UE-specific channel.

In addition to a relay UE-specific offset, a common offset to be commonly applied to a plurality of relay UEs may be adopted. For example, an offset to be commonly applied to relay UEs connected to a specific cell, that is, a cell-specific offset may be set for the remote UE. Here, an offset value of one or more cells may be set for the remote UE. A message transmitted from a relay UE to notify the remote UE of the presence of the relay UE may include an ID of a cell to which the relay UE belongs. Thus, the remote UE may identify the serving cell of the relay UE through the cell ID included in the message transmitted from the relay UE. When the serving cell of the relay UE is identified, the remote UE may apply the offset corresponding to the cell to the relay UE.

Figure 18:
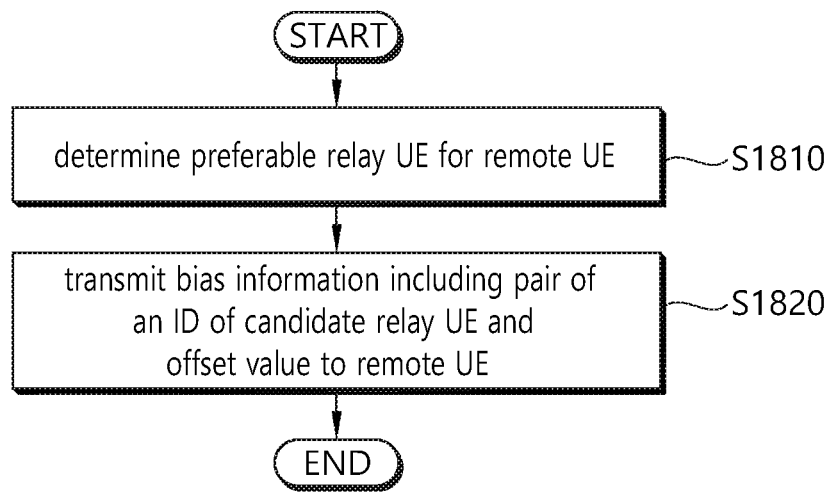
FIG. 18 illustrates a method for a network to transmit bias information.

FIG. 18 illustrates a method for a network to transmit bias information.

Referring to FIG. 18, a network determines a preferable relay UE for a remote UE (S1810) and transmits bias information including a pair of an ID of a candidate relay UE and an offset value to the remote UE (S1820).

The network (BS) may signal a candidate relay UE-specific offset value. The offset value may be used to rank candidate relay UEs.

The BS may broadcast the offset value or may signal the offset value using a dedicated signal to a specific UE. The BS may notify each candidate relay UE of a pair of an L2 ID of the candidate relay UE and an offset value of the candidate relay UE. The remote UE may apply an offset value when ranking candidate relay UEs.

A default offset may be a predetermined value (for example, 0) and may be applied when no offset value is signaled.

Alternatively, the default value may be applied when the remote UE is located in the cell coverage. A preconfiguration is applied to the remote UE located out of the cell coverage for a D2D operation, in which the foregoing parameters (relayRefMinHyst, relayRefDiffHyst, and relayOffset) may be provided through the preconfiguration.

<AS-Upper Layer Interaction>

There is a plurality of layers in one UE. It may be an issue which layer among the plurality of layers ultimately selects a relay UE, which may influence the specifications.

There may be two types of criteria for selecting a relay UE. A first one is a radio environment-related criterion, for example, suitability and a reselection triggering criterion. A second one is a radio environment-unrelated criterion, for example, a service code. In detail, when the suitability of a selected relay UE is determined based on the RSRP (for example, S-RSRP/SD-RSRP) of a sidelink between a remote UE and a relay UE, the suitability is related to a radio communication channel environment and thus may be a radio environment-related criterion. A radio environment-unrelated criterion may be, for example, a relay service code. The relay service code may be determined based on the content/purpose of a relay service and thus may not be a radio environment-related criterion.

For an AS layer, the minimum criterion for selecting a relay UE is a condition of suitability. Further, in selecting a relay UE, it may be required to select a candidate relay UE in the best rank.

A finally selected relay UE needs to satisfy both an upper-layer criterion and an AS-layer criterion. Here, one of the following two methods may be employed in view of an interaction between an upper layer and the AS layer.

First, a method for an upper layer to finally select a relay UE is illustrated.

An AS layer of a remote UE receives a relay discovery message from a candidate relay UE.

The AS layer of the remote UE checks the suitability of a detected candidate relay UE based on PC5 measurement.

When the suitability is satisfied, the AS layer of the remote UE decodes the received discovery message and transmits the decoded message to an upper layer (ProSe upper layer). When transmitting the decoded message, the AS layer of the remote UE may transmit a corresponding PC5 measurement result along with the decoded message.

The upper layer of the remote UE performs evaluation considering both a radio environment-related criterion and a radio environment-unrelated criterion and finally selects a relay UE.

Next, a method for an AS layer to finally select a relay UE is illustrated.

An AS layer of a remote UE receives a relay discovery message from a candidate relay UE.

The AS layer of the remote UE checks the suitability of a detected candidate relay UE based on PC5 measurement.

When the suitability is satisfied, the AS layer of the remote UE decodes the received discovery message and transmits the decoded message to an upper layer (ProSe upper layer).

The upper layer of the remote UE performs evaluation for relay UE selection/reselection only considering a radio environment-unrelated criterion.

The upper layer of the remote UE provides a list of candidate relay UEs satisfying the radio environment-unrelated criterion.

The AS layer of the remote UE performs evaluation for relay UE selection/reselection only considering a radio environment-related criterion and finally selects a relay UE.

The first option involves less interaction between the AS layer and the upper layer, while the second option clarifies a functional division between the radio environment-related criterion and the radio environment-unrelated criterion. In the specifications, the first option is preferable to minimize the interaction between the AS layer and the upper layer, and the second option is preferable to clarify a functional division between the radio environment-related criterion and the radio environment-unrelated criterion.

Figure 19:
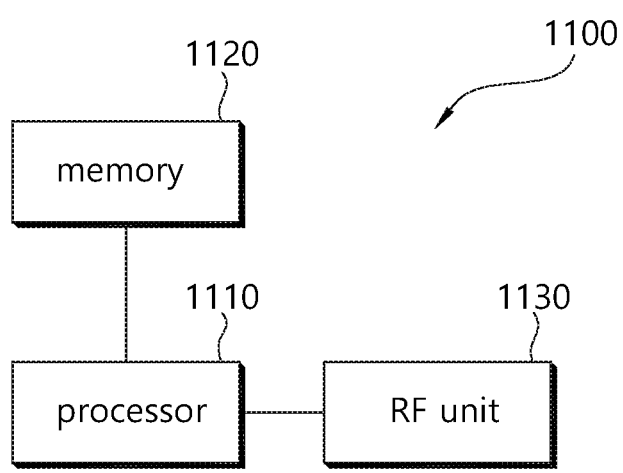
FIG. 19 is a block diagram illustrating a UE according to an embodiment of the present invention.

FIG. 19 is a block diagram illustrating a UE according to an embodiment of the present invention.

Referring to FIG. 19, the UE 1100 includes a processor 1110, a memory 1120, and a radio frequency (RF) unit 1130. The processor 1110 performs proposed functions, processes, and/or methods. The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for selecting a relay user equipment (UE) performed by a remote UE in wireless communication system, the method comprising:
   determining whether a measurement of a current relay UE is smaller than a threshold; and
   selecting a candidate relay UE satisfying a specific condition as a relay UE when the measurement of the current relay UE is smaller than the threshold,
   wherein the candidate relay UE is selected as the relay UE when a measurement of the candidate relay UE is greater than a minimum hysteresis value (minHyst) based on the threshold, and
   wherein, when an upper layer of the remote UE indicates a relay UE reselection, the candidate relay UE satisfying the specific condition is selected as the relay UE even if the measurement of the current relay UE is equal to or greater than the threshold.

2. The method of claim 1, wherein the measurement of the current relay UE is a reference signal received power (RSRP) of a reference signal received from the current relay UE.

3. The method of claim 1, wherein the threshold is provided by a network.

4. The method of claim 1, wherein the current relay UE and the selected relay UEs are devices providing a relay service between the remote UE and a network.

5. The method of claim 1, further comprising:
   transferring a connection from the current relay UE to the selected candidate relay UE.

6. A user equipment (UE) comprising:
   a transceiver to transmit and receive a radio signal; and
   a processor operatively connected to the transceiver,
   wherein the processor:
      determines whether a measurement of a current relay UE is smaller than a threshold, and
      selects a candidate relay UE satisfying a specific condition as a relay UE when the measurement of the current relay UE is smaller than the threshold,
      wherein the candidate relay UE is selected as the relay UE only when a measurement of the candidate relay UE is greater than a minimum hysteresis value (minHyst) based on the threshold, and
      wherein, when an upper layer of the remote UE indicates a relay UE reselection, the candidate relay UE satisfying the specific condition is selected as the relay UE even if the measurement of the current relay UE is equal to or greater than the threshold.

7. The UE of claim 6, wherein the measurement of the current relay UE is a reference signal received power (RSRP) of a reference signal received from the current relay UE.

8. The UE of claim 6, wherein the threshold is by from a network.

9. The UE of claim 6, wherein the current relay UE and the selected relay UEs are devices providing a relay service between the UE and a network.

10. The UE of claim 6, wherein the processor further transfers a connection from the current relay UE to the selected candidate relay UE.

* * * * *